US012677323B2

(12) United States Patent
Lin et al.

(10) Patent No.: US 12,677,323 B2
(45) Date of Patent: Jul. 7, 2026

(54) METHODS FOR CHANNEL TRANSMISSION AND TERMINAL DEVICE

(71) Applicant: GUANGDONG OPPO MOBILE TELECOMMUNICATIONS CORP., LTD., Dongguan (CN)

(72) Inventors: Xue Lin, Dongguan (CN); Shukun Wang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 327 days.

(21) Appl. No.: 18/222,014

(22) Filed: Jul. 14, 2023

(65) Prior Publication Data

US 2023/0363007 A1 Nov. 9, 2023

Related U.S. Application Data

(63) Continuation of application No. PCT/CN2021/085345, filed on Apr. 2, 2021.

(51) Int. Cl.
*H04W 74/0833* (2024.01)
*H04W 48/12* (2009.01)
*H04W 74/0836* (2024.01)

(52) U.S. Cl.
CPC ....... *H04W 74/0833* (2013.01); *H04W 48/12* (2013.01); *H04W 74/0836* (2024.01)

(58) Field of Classification Search
CPC ................................................ H04W 74/0833
See application file for complete search history.

(56) References Cited

U.S. PATENT DOCUMENTS

| | | | |
|---|---|---|---|
| 2015/0237624 A1* | 8/2015 | Tang | H04W 48/16 |
| | | | 370/329 |
| 2016/0353440 A1* | 12/2016 | Lee | H04W 72/53 |

(Continued)

FOREIGN PATENT DOCUMENTS

| | | |
|---|---|---|
| CN | 112400356 A | 2/2021 |
| EP | 3858064 A1 | 8/2021 |
| WO | 2021031098 A1 | 2/2021 |

OTHER PUBLICATIONS

Huawei et al: "RA and CG based small data transmission", 3GPP Draft; R1-2101267, 3rd Generation Partnership Project (3GPP), Mobile Competence Centre; 650, Route Des Lucioles; F-06921 Sophia-Antipolis Cedex; France, vol. RAN WG1, No. E-meeting; Jan. 25, 2021-Feb. 5, 2021, Jan. 19, 2021 (Jan. 19, 2021), XP051971477, paragraphs [0001]-[0003]. 7 pages.

(Continued)

*Primary Examiner* — Khaled M Kassim
*Assistant Examiner* — Shima Wasel
(74) *Attorney, Agent, or Firm* — BAYES PLLC

(57) ABSTRACT

A method for channel transmission includes that: a terminal device receives first configuration information, where the first configuration information is used for determining a target Search Space (SS) where the terminal device receives a downlink channel, the downlink channel being transmitted after a contention conflict is successfully resolved in a Random Access-Small Data Transmission (RA-SDT). Another method for channel transmission includes that: a network device sends first configuration information to a terminal device, where the first configuration information is used by the terminal device to determine a target Search Space (SS) where a downlink channel is received, the downlink channel being transmitted after a contention conflict is successfully resolved in a Random Access-Small (Continued)

A network device sends first configuration information to a terminal device, where the first configuration information is used by the terminal device to determine a target SS where a downlink channel is received, the downlink channel being transmitted after a contention conflict is successfully resolved in a RA-SDT

S301

The network device sends first indication information to the terminal device, where the first indication information is used for determining a first index value

S302

Data Transmission (RA-SDT). A terminal device is also provided.

12 Claims, 6 Drawing Sheets

(56)                    References Cited

U.S. PATENT DOCUMENTS

| | | | | |
|---|---|---|---|---|
| 2021/0274535 | A1* | 9/2021 | Yi | H04L 5/0092 |
| 2022/0095409 | A1* | 3/2022 | Agiwal | H04W 76/27 |
| 2022/0232403 | A1* | 7/2022 | Lee | H04W 24/08 |
| 2022/0272659 | A1* | 8/2022 | Agiwal | H04W 4/90 |
| 2022/0304046 | A1* | 9/2022 | Lin | H04L 5/0053 |
| 2023/0224997 | A1* | 7/2023 | Agiwal | H04W 56/0045 |
| 2023/0337288 | A1* | 10/2023 | Zhou | H04L 1/1858 |
| 2024/0155725 | A1* | 5/2024 | Agiwal | H04W 76/27 |
| 2024/0196413 | A1* | 6/2024 | Chatterjee | H04L 5/0053 |

OTHER PUBLICATIONS

Supplementary European Search Report in the European application No. 21934091.6, mailed on Dec. 15, 2023. 10 pages.
Communication pursuant to Article 94(3) EPC issued in corresponding European Application No. 21934091.6, mailed Sep. 6, 2024.
International Search Report in the international application No. PCT/CN2021/085345, mailed on Jan. 5, 2022. 6 pages with English translation.
Written Opinion of the International Search Authority in the international application No. PCT/CN2021/085345, mailed on Jan. 5, 2022. 9 pages with English translation.
3GPP TSG-RAN WG2 #113bis-e R2-2103519, Electronic meeting, Apr. 12, 2021-Apr. 20, 2021, Agenda Item: 8.6.4, Source: Ericsson, Title: RACH based small data transmission, Document for: Discussion, Decision. 4 Pages.
3GPP TSG RAN WG1 #104-e R1-2100317, e-Meeting, Jan. 25-Feb. 5, 2021, Source: CATT, Title: Discussion on Physical layer aspects of small data transmission, Agenda Item: 5, Document for: Discussion and Decision. 4 Pages.
3GPP TSG RAN WG1 #104-e R1-2100080, e-Meeting, Jan 25-Feb. 5, 2021, Title: Discussion on the physical layer aspects of small data transmission, Source: ZTE, Sanechips, Agenda Item: 5, Document for: Discussion and Decision. 7 Pages.
3GPP TSG RAN Meeting #86 RP-193252, Sitges, Spain, Dec. 9-12, 2019, Source: ZTE Corporation, Title: Work Item on NR smalldata transmissions in INACTIVE state , Document for: Approval, Agenda Item: 9.1.2. 4 Pages.
3GPP TSG-RAN WG1 Meeting #104-e R1-2102125, e-Meeting, Jan. 25-Feb. 5, 2021, Title: Reply LS on physical layer aspects of small data transmission, Response to: R2-2010841, LS on physical layer aspects of small data transmission, Release: Rel-17, Work Item: NR_SmallData_INACTIVE-Core. 2 Pages.

* cited by examiner

100

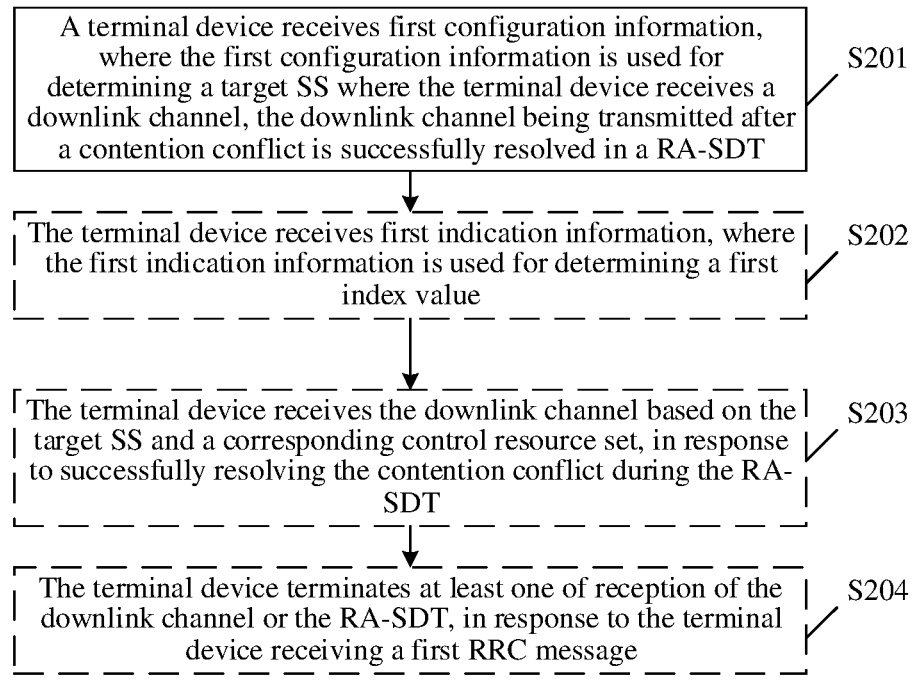

A terminal device receives first configuration information, where the first configuration information is used for determining a target SS where the terminal device receives a downlink channel, the downlink channel being transmitted after a contention conflict is successfully resolved in a RA-SDT          S201

The terminal device receives first indication information, where the first indication information is used for determining a first index value          S202

The terminal device receives the downlink channel based on the target SS and a corresponding control resource set, in response to successfully resolving the contention conflict during the RA-SDT          S203

The terminal device terminates at least one of reception of the downlink channel or the RA-SDT, in response to the terminal device receiving a first RRC message          S204

FIG. 3

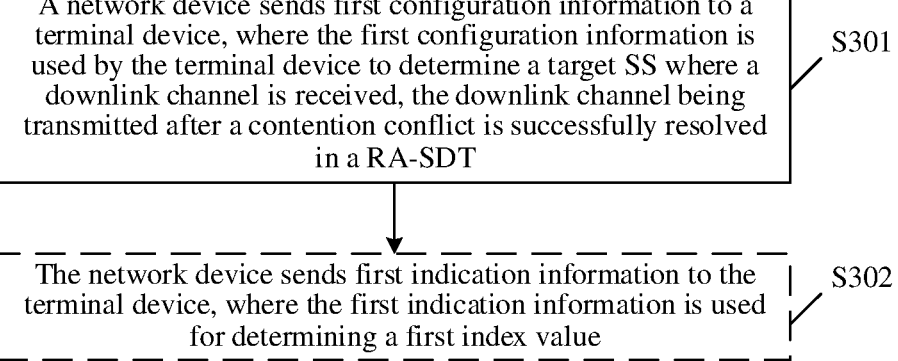

A network device sends first configuration information to a terminal device, where the first configuration information is used by the terminal device to determine a target SS where a downlink channel is received, the downlink channel being transmitted after a contention conflict is successfully resolved in a RA-SDT          S301

The network device sends first indication information to the terminal device, where the first indication information is used for determining a first index value          S302

FIG. 4

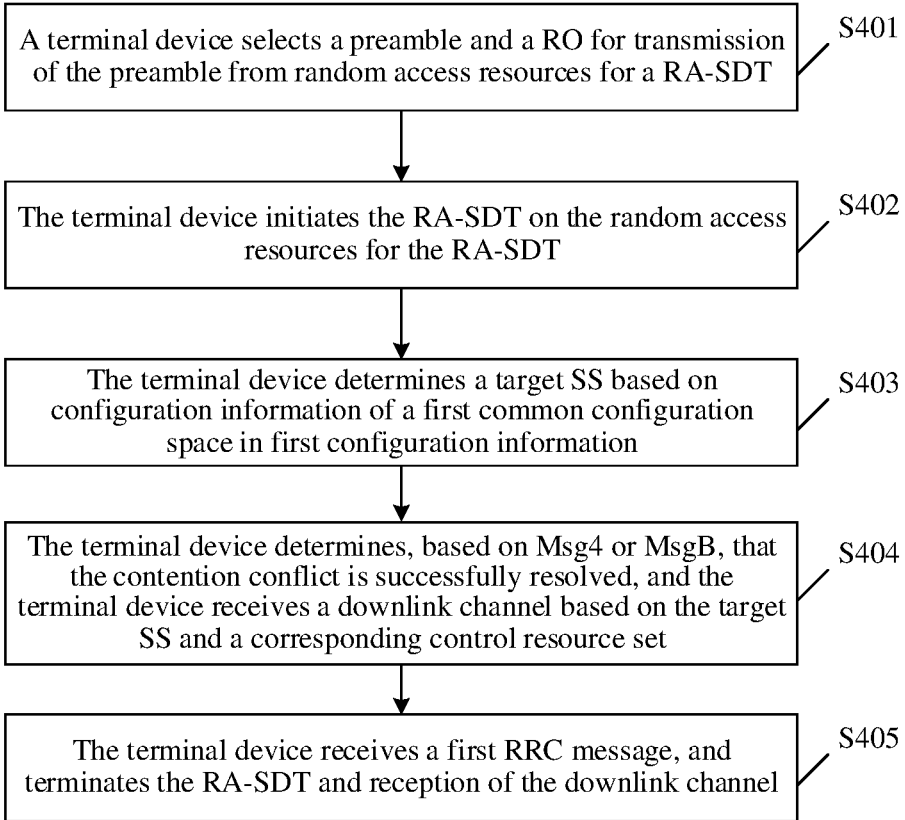

A terminal device selects a preamble and a RO for transmission of the preamble from random access resources for a RA-SDT    S401

The terminal device initiates the RA-SDT on the random access resources for the RA-SDT    S402

The terminal device determines a target SS based on configuration information of a first common configuration space in first configuration information    S403

The terminal device determines, based on Msg4 or MsgB, that the contention conflict is successfully resolved, and the terminal device receives a downlink channel based on the target SS and a corresponding control resource set    S404

The terminal device receives a first RRC message, and terminates the RA-SDT and reception of the downlink channel    S405

FIG. 5

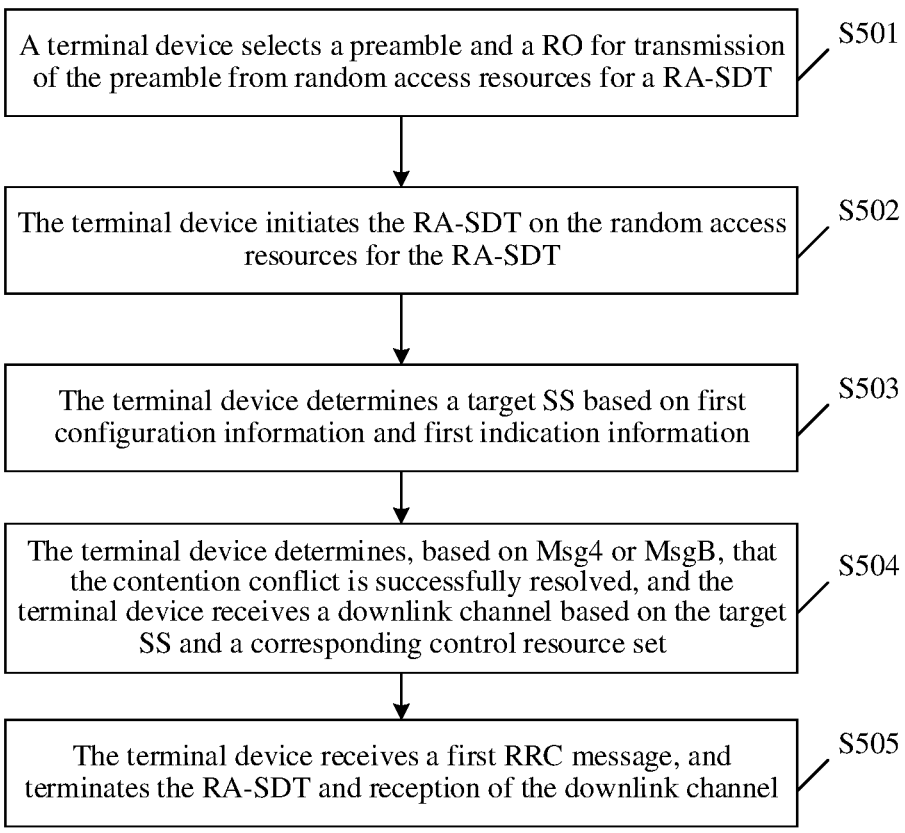

| | |
|---|---|
| A terminal device selects a preamble and a RO for transmission of the preamble from random access resources for a RA-SDT | S501 |
| The terminal device initiates the RA-SDT on the random access resources for the RA-SDT | S502 |
| The terminal device determines a target SS based on first configuration information and first indication information | S503 |
| The terminal device determines, based on Msg4 or MsgB, that the contention conflict is successfully resolved, and the terminal device receives a downlink channel based on the target SS and a corresponding control resource set | S504 |
| The terminal device receives a first RRC message, and terminates the RA-SDT and reception of the downlink channel | S505 |

FIG. 6

Terminal device 600

Receiving unit 601

FIG. 7

METHODS FOR CHANNEL TRANSMISSION AND TERMINAL DEVICE

CROSS-REFERENCE TO RELATED APPLICATION

This application is a continuation of International Application No. PCT/CN2021/085345, entitled "CHANNEL TRANSMISSION METHOD, ELECTRONIC DEVICE, AND STORAGE MEDIUM", filed on Apr. 2, 2021, the disclosure of which is hereby incorporated by reference in its entirety.

TECHNICAL FIELD

The disclosure relates to the technical field of wireless communications, and in particular to methods for channel transmission method, and a terminal device.

BACKGROUND

Random Access-Small Data Transmission (RA-SDT) supports subsequent data transmission. However, it has not been specified how to determine a Search Space (SS) used by a terminal device to receive data or channels during the RA-SDT.

SUMMARY

In order to solve the above technical problem, embodiments of the disclosure provide a channel transmission method, an electronic device, and a storage medium, which specify a Search Space (SS) used by a terminal device to receive data or channels after a contention conflict is successfully resolved during the RA-SDT.

According to a first aspect, an embodiment of the disclosure provides a channel transmission method, which includes the following operation. A terminal device receives first configuration information, where the first configuration information is used for determining a target SS where the terminal device receives a downlink channel.

According to a second aspect, an embodiment of the disclosure provides a channel transmission method, which includes the following operation. A network device sends first configuration information to a terminal device, where the first configuration information is used by the terminal device to determine a target SS where a downlink channel is received.

According to a third aspect, an embodiment of the disclosure provides a terminal device. The terminal device includes a receiving unit configured to receive first configuration information, where the first configuration information is used for determining a target SS where the terminal device receives a downlink channel.

According to a fourth aspect, an embodiment of the disclosure provides a network device, the network device includes a sending unit configured to send first configuration information to a terminal device, where the first configuration information is used by the terminal device to determine a target SS where a downlink channel is received.

According to a fifth aspect, an embodiment of the disclosure provides a terminal device, including a processor and a memory configured to store a computer program executable by the processor, here, the processor is configured to run the computer program, to cause the terminal device to perform the above channel transmission method executed by the terminal device.

According to a sixth aspect, an embodiment of the disclosure provides a network device, including a processor and a memory configured to store a computer program executable by the processor, here, the processor is configured to run the computer program, to cause the network device to perform the above channel transmission method executed by the network device.

According to a seventh aspect, an embodiment of the disclosure provides a chip, including a processor configured to call and run a computer program from a memory, to cause a device installed with the chip to perform the above channel transmission method executed by the terminal device.

According to an eighth aspect, an embodiment of the disclosure provides a chip, including a processor configured to call and run a computer program from a memory, to cause a device installed with the chip to perform the above channel transmission method executed by the network device.

According to a ninth aspect, an embodiment of the disclosure provides a storage medium having stored therein an executable program which, when executed by a processor, causes the processor to perform the above channel transmission method executed by the terminal device.

According to a tenth aspect, an embodiment of the disclosure provides a storage medium, having stored therein an executable program which, when executed by a processor, causes the processor to perform the above channel transmission method executed by the network device.

According to an eleventh aspect, an embodiment of the disclosure provides a computer program product, including computer program instructions which cause a computer to perform the above channel transmission method executed by the terminal device.

According to a twelfth aspect, an embodiment of the disclosure provides a computer program product, including computer program instructions which cause a computer to perform the above channel transmission method executed by the network device.

According to a thirteenth aspect, an embodiment of the disclosure provides a computer program, which causes a computer to execute the above channel transmission method executed by the terminal device.

According to a fourteenth aspect, an embodiment of the disclosure provides a computer program, which causes a computer to execute the above channel transmission method executed by the network device.

BRIEF DESCRIPTION OF THE DRAWINGS

FIG. 3 is a schematic diagram of an optional processing flow of a channel transmission method according to an embodiment of the disclosure.

FIG. 4 is a schematic diagram of an optional processing flow of a channel transmission method according to an embodiment of the disclosure.

FIG. 5 is a schematic diagram of a detailed optional processing flow of a RA-SDT method according to an embodiment of the disclosure.

FIG. 6 is another detailed optional processing flow of a RA-SDT method according to an embodiment of the disclosure.

FIG. 7 is a schematic structural diagram of composition of a terminal device according to an embodiment of the disclosure.

DETAILED DESCRIPTION

In order to understand characteristics and technical contents of embodiments of the disclosure in more detail, implementations of the embodiments of the disclosure will be described in detail below with reference to the drawings. The drawings are provided for reference and explanation only and are not intended to limit the embodiments of the disclosure.

In a Long Term Evolution (LTE) system, Early Data Transmission (EDT) is introduced. During the EDT process, a terminal device may be always kept in an idle state, a suspend state or an inactive state, and completes transmissions of uplink and/or downlink small data packets in the idle state, the suspend state or the inactive state. A network device may configure a maximum Transmission Block (TB) size allowed by the current network device on a System Information Block (SIB) 2. The terminal device determines an amount of to-be-transmitted data itself. When the amount of to-be-transmitted data is less than the maximum TB size, the terminal device may initiate the EDT transmission; otherwise, the terminal device uses a normal connection setup process to enter a connected state to transmit data.

Figure 1:
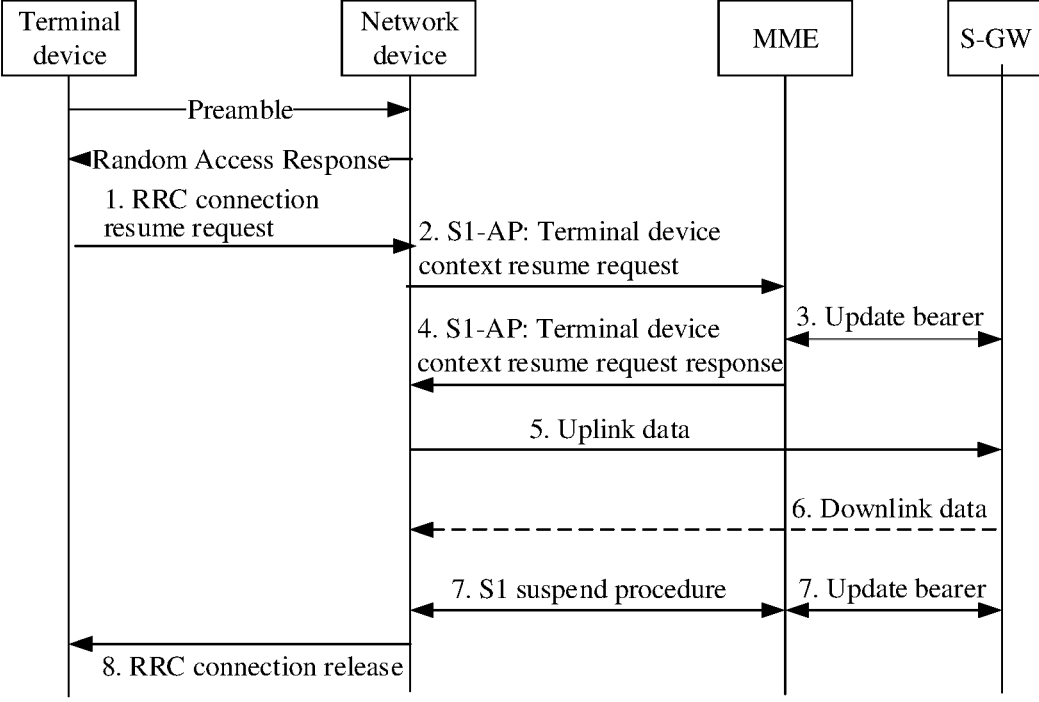
FIG. 1 is a schematic flowchart of Early Data Transmission (EDT) according to the disclosure.

A schematic flowchart of the EDT is shown in FIG. 1. When a cell where the terminal device initiates an uplink EDT (UP-EDT) is the same as a last serving cell of the terminal device, the network device may directly deliver uplink data to a core network after receiving the uplink data and a connection resume request transmitted by the terminal device.

In a New Radio (NR) system, a Physical Downlink Control Channel (PDCCH) Search Space (SS) is similar to that of the LTE system, and the terminal device blindly detects Downlink Control Information (DCI) from the network device in the PDCCH SS. Different PDCCH SS configurations specify when and where the terminal device searches for the PDCCH. The PDCCH SS includes a Common Search Space (CSS) and a User Equipment (UE)-Specific Search Space (USS). The terminal device monitors different types of DCI according to configuration of the SS. Specific manners in which the terminal device monitors the DCI are as follows.

A set of candidate PDCCHs to be monitored by the terminal device are determined according to a PDCCH SS set. The SS set may be a CSS set or a USS set. The terminal device monitors the candidate PDCCHs in one or more SS sets as follows.

1) a Type0-PDCCH CSS set configured by pdcch-ConfigSIB1 in MIB or by searchSpaceSIB1 in PDCCH-ConfigCommon or by searchSpaceZero in PDCCH-ConfigCommon for a DCI format with CRC scrambled by a SI-RNTI on the primary cell of the MCG.

2) a Type0A-PDCCH CSS set configured by searchSpaceOtherSystemInformation in PDCCH-ConfigCommon for a DCI format with CRC scrambled by a SI-RNTI on the primary cell of the MCG.

3) a Type1-PDCCH CSS set configured by ra-SearchSpace in PDCCH-ConfigCommon for a DCI format with CRC scrambled by a RA-RNTI, a MsgB-RNTI, or a TC-RNTI on the Primary cell.

4) a Type2-PDCCH CSS set configured by paging-SearchSpace in PDCCH-ConfigCommon for a DCI format with CRC scrambled by a P-RNTI on the primary cell of the MCG.

5) a Type3-PDCCH CSS set configured by SearchSpace in PDCCH-Config with searchSpaceType=common for DCI formats with CRC scrambled by INT-RNTI, SFI-RNTI, TPC-PUSCH-RNTI, TPC-PUCCH-RNTI, TPC-SRS-RNTI, or CI-RNTI and, only for the primary cell, C-RNTI, MCS-C-RNTI, CS-RNTI(s), or PS-RNTI and 6) a USS set configured by SearchSpace in PDCCH-Config with searchSpaceType=ue-Specific for DCI formats with CRC scrambled by C-RNTI, MCS-C-RNTI, SP-CSI-RNTI, CS-RNTI(s), SL-RNTI, SL-CS-RNTI, or SL-L-CS-RNTI.

In the NR system, a Radio Resource Control (RRC) state of the terminal device may be divided into three types, i.e., a RRC idle state (RRC_IDLE), a RRC inactive state (RRC_INACTIVE) and a RRC connected state (RRC_CONNECTED), respectively. The RRC_INACTIVE state is a new state introduced by the NR system with consideration from the perspective of energy saving. For the terminal device in the RRC_INACTIVE state, radio bearers and all radio resources are released, but both the terminal device and the network device retain an access context of the terminal device to quickly resume RRC connection. The network device usually keeps a terminal device with infrequent data transmission in the RRC_INACTIVE state. Before Release-16 (Rel-16), the terminal device in the RRC_INACTIVE state does not support data transmission, and when uplink (Mobile Original, MO) data or downlink (Mobile Terminated, MT) data arrives, the terminal device needs to resume connection to perform data transmission, and is released to the RRC_INACTIVE state after the data transmission is completed. In case of a terminal device with a small amount of data and a low transmission frequency, such transmission mechanism may result in unnecessary power consumption and signaling overhead. Therefore, a project is set up in Rel-17 to carry out research on a Small Data Transmission (SDT) in the RRC_INACTIVE state, and targets of the project mainly have two directions, i.e., a uplink small data transmission based on a random access process (two-step/four-step), and a uplink small data transmission based on pre-configured resources (such as CG type1).

In order to support subsequent data transmission, that is, after the terminal device completes first uplink transmission, uplink and/or downlink data continues to be transmitted through subsequent scheduling of the network device.

In the related art, the terminal device in the RRC_INACTIVE state and the RRC_IDLE state monitors downlink transmission in the random access process according to configuration of Type1-PDCCH CSS. However, since the SDT supports the subsequent data transmission, when the terminal device still monitors subsequent uplink and/or downlink transmission according to the configuration of the Type1-PDCCH CSS, congestion of downlink DCI scheduling resources is caused, and a success probability of a legacy terminal device executing the random access process is affected.

Based on the above problems, the disclosure provides a channel transmission method. Technical solutions of the embodiments of the disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS) system, a LTE system, a LTE Frequency Division Duplex (FDD) system, a LTE Time Division Duplex (TDD) system, an Advanced Long Term Evolution (LTE-A) system, an NR system, an evolutional system of the NR system, a LTE-based access to unlicensed spectrum (LTE-U) system, an NR-based access to unlicensed spectrum (NR-U) system, a Universal Mobile Telecommunication System (UMTS), a Worldwide Interoperability for Microwave Access (WiMAX) communication system, a Wireless Local Area Network (WLAN), a Wireless Fidelity (WiFi), a next generation communication system, or other communication systems, or the like.

System architectures and service scenarios described in the embodiments of the disclosure are intended to explain the technical solutions of the embodiments of the disclosure more clearly, and do not constitute limitation on the technical solutions provided in the embodiments of the disclosure. It may be known by those of ordinary skill in the art that with evolution of network architectures and occurrence of new service scenarios, the technical solutions provided in the embodiments of the disclosure are also applicable to similar technical problems.

The network device involved in the embodiments of the disclosure may be a common base station (such as a NodeB or an evolutional NodeB (eNB) or a next generation NodeB (gNB)), a New Radio controller (NR controller), a centralized unit, an NR base station, a radio remote module, a micro base station, a relay, a distributed unit, a Transmission Reception Point (TRP), a Transmission Point (TP), or any other device. Specific technology used by the network device and specific form of the network device are not limited in the embodiments of the disclosure. For ease of description, in all embodiments of the disclosure, devices that provide wireless communication functions for the terminal device are collectively referred to as network devices.

In the embodiments of the disclosure, the terminal device may be any terminal, for example, the terminal device may be User Equipment (UE) for machine type communication. That is, the terminal device may also be referred to as a UE, a Mobile Station (MS), a mobile terminal, a terminal, or the like. The terminal device may communicate with one or more core networks via a Radio Access Network (RAN). For example, the terminal device may be a mobile phone (or referred to as a "cellular" phone), a computer provided with a mobile terminal, or the like. For example, the terminal device may also be a portable mobile device, a pocket-type mobile device, a handheld mobile device, a computer built-in mobile device, or a vehicle-mounted mobile device, which exchanges at least one of language or data with the RAN. These are not specifically limited in the embodiments of the disclosure.

Optionally, the network device and the terminal device may be deployed on land, including indoor or outdoor, handheld or vehicle-mounted; or, may be deployed on a water surface; or, may also be deployed on an aircraft, a balloon and an artificial satellite in the air. The embodiments of the disclosure do not limit application scenarios of the network device and the terminal device.

Optionally, communication between the network device and the terminal device and communication between the terminal device and the terminal device may be performed through a licensed spectrum, or through a unlicensed spectrum, or through both the licensed spectrum and the unlicensed spectrum. Communication between the network device and the terminal device and communication between the terminal device and the terminal device may be performed through a spectrum below 7 gigahertz (GHz), or through a spectrum above 7 GHz, or through both the spectrum below 7 GHz and the spectrum above 7 GHz. The embodiments of the disclosure do not limit spectrum resources used between the network device and the terminal device.

Generally speaking, a traditional communication system supports a limited number of connections, and is also easy to be implemented; however, with the development of communication technologies, a mobile communication system not only supports traditional communication, but also supports such as device to device (D2D) communication, machine to machine (M2M) communication, machine type communication (MTC), vehicle to vehicle (V2V) communication, or the like, and the embodiments of the disclosure may also be applied to these communication systems.

Figure 2:
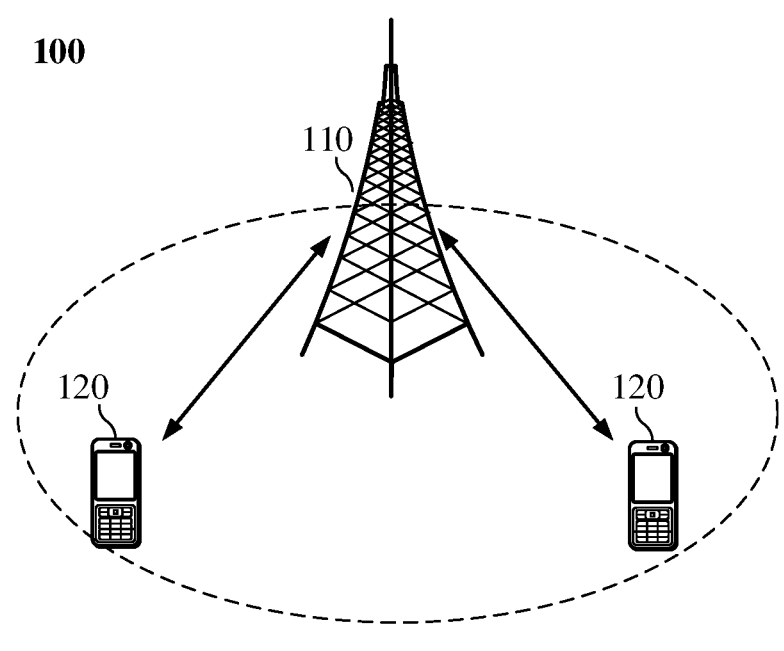
FIG. 2 is a schematic structural diagram of composition of a communication system according to an embodiment of the disclosure.

Exemplarily, the communication system 100 to which the embodiments of the disclosure are applied is shown in FIG. 2. The communication system 100 may include a network device 110. The network device 110 may be a device in communication with a terminal device 120 (or referred to as a communication terminal or a terminal). The network device 110 may provide communication coverage for a specific geographic area, and may communicate with terminal devices located within the coverage area. Optionally, the network device 110 may be a Base Transceiver Station (BTS) in a GSM system or a CDMA system, or a NodeB (NB) in a WCDMA system, or an evolutional NodeB (eNB or eNodeB) in a LTE system, or a radio controller in a Cloud Radio Access Network (CRAN); or, the network device may be a mobile switching center, a relay station, an access point, a vehicle-mounted device, a wearable device, a hub, a switch, a bridge, a router, a network-side device in a 5th Generation (5G) network, or a network device in a future evolutional Public Land Mobile Network (PLMN), or the like.

The communication system 100 further includes at least one terminal device 120 located within a coverage range of the network device 110. As used herein, "terminal device" includes, but is not limited to, a device arranged to receive/send a communication signal through a wired line connection, for example, through a Public Switched Telephone Network (PSTN), a Digital Subscriber Line (DSL), a digital cable, or a direct cable connection; and/or through another data connection/network; and/or through a radio interface, for example, for a cellular network, a Wireless Local Area Network (WLAN), a digital television network such as a Digital Video Broadcasting Handheld (DVB-H) network, a satellite network, an Amplitude Modulation-Frequency Modulation (AM-FM) broadcast transmitter; and/or another terminal device; and/or an Internet of Things (IoT) device. A terminal device configured to communicate via the radio interface may be referred to as a "wireless communication terminal", a "wireless terminal" or a "mobile terminal". Examples of the mobile terminal include, but are not limited to a satellite or a cellular phone; a Personal Communication System (PCS) terminal which may combine cellular radio phone and data processing, facsimile and data communication capabilities; a Personal Digital Assistant (PDA) which may include a radio phone, a pager, Internet/Intranet access, a web browser, a notebook, a calendar, and/or a Global Positioning System (GPS) receiver; and a conventional laptop and/or handheld receiver or other electronic devices including radio phone transceivers. The terminal device may refer to an access terminal, a UE, a user unit, a subscriber station, a mobile station, a mobile platform, a remote station, a remote terminal, a mobile device, a user terminal, a terminal, a wireless communication device, a user agent, or a user device. The access terminal may be a cellular phone, a cordless phone, a Session Initiation Protocol (SIP) phone, a Wireless Local Loop (WLL) station, a PDA, a handheld device having a wireless communication function, a computation device, or other processing devices connected to a wireless modem, a vehicle-mounted device, a wearable device, a terminal device in a 5G network, or a terminal device in a future evolutional PLMN, or the like.

Optionally, a D2D communication may be performed between the terminal devices 120.

Optionally, a 5G system or a 5G network may also be referred to as an NR system or an NR network.

FIG. 2 exemplarily shows a network device and two terminal devices. Optionally, the communication system 100 may include multiple network devices, and a respective coverage range of each of the network devices may include other numbers of terminal devices, which is not limited in the embodiments of the disclosure.

Optionally, the communication system 100 may further include other network entities, such as a network controller, a mobility management entity, or the like, which is not limited in the embodiments of the disclosure.

It should be understood that in the embodiments of the disclosure, a device having a communication function in a network/system may be referred to as a communication device. Taking the communication system 100 shown in FIG. 2 as an example, the communication device may include the network device 110 and the terminal device 120 having communication functions, and the network device 110 and the terminal device 120 may be specific devices as described above, and are not elaborated here; the communication device may further include other devices in the communication system 100, such as a network controller, a mobility management entity, or other network entities, which is not limited in the embodiments of the disclosure.

As shown in FIG. 3, an optional processing flow of a channel transmission method according to an embodiment of the disclosure is provided and may include at least the following operation S201.

At S201, a terminal device receives first configuration information, where the first configuration information is used for determining a target SS where the terminal device receives a downlink channel, and the downlink channel is transmitted after a contention conflict is successfully resolved in a Random Access-Small Data Transmission (RA-SDT).

In some embodiments, the terminal device receives the first configuration information transmitted by a network device, and the first configuration information may be carried in at least one of a system broadcast message or dedicated signaling.

The first configuration information includes at least one of configuration information of a first CSS or an SS configuration list. The SS configuration list includes configuration information of at least one CSS. As an example, the first configuration information may include the configuration information of the first CSS. As another example, the first configuration information may include the SS configuration list, and the SS configuration list includes the configuration information of at least one CSS. As yet another example, the first configuration information may further include the configuration information of the first CSS and the SS configuration list, and the SS configuration list includes the configuration information of at least one CSS.

In some embodiments, when the first configuration information includes the configuration information of the first CSS, or when the first configuration information includes the configuration information of the first CSS and the SS configuration list, the terminal device determines that the target SS where the downlink channel is received is the first CSS.

In some embodiments, the configuration information of the first CSS is configuration information used for scheduling at least one of the SDT or a subsequent transmission of the SDT. As an example, the target SS determined based on the configuration information of the first CSS is used for scheduling at least one of the SDT or the subsequent transmission of the SDT.

In some other embodiments, when the first configuration information includes the SS configuration list, and the SS configuration list includes the configuration information of at least one CSS, the channel transmission method further includes the following operation S202.

At S202, the terminal device receives first indication information, where the first indication information is used for determining a first index value.

In some embodiments, the first indication information may be carried in at least one of: a Media Access Control Control Element (MAC CE), a DCI, or RRC signaling. As an example, the MAC CE may be carried in Msg4 or MsgB. As an example, the first indication information may be carried in a RRC Release message.

In some embodiments, the first indication information may include the first index value.

In some other embodiments, the first indication information may include an Identity-Radio Network Temporary Identifier (I-RNTI). The first index value is obtained by the I-RNTI performing a modulus operation on a first numerical value, and the first numerical value is the number of configuration information of CSSs in the SS configuration list. For example, the SS configuration list includes configuration information of five CSSs, identifiers (IDs) of the five CSSs are 1-5 or 0-4, the first indication information includes the I-RNTI, then the terminal device determines the target SS according to a value obtained by I-RNTI mod 5; and when the value obtained by the I-RNTI mod 5 is 1, the target SS is a CSS with an ID of 1 in the SS configuration list.

In some embodiments, configuration information of each CSS in the SS configuration list corresponds to a respective index value or a respective ID, the terminal device searches the SS configuration list for configuration information of a CSS corresponding to the first index value, and determines that the CSS indicated by the configuration information of the CSS corresponding to the first index value is the target SS.

In some embodiments, the method further includes the following operation S203.

At S203, the terminal device receives the downlink channel based on the target SS, in response to successfully resolving the contention conflict during the RA-SDT.

In some embodiments, the terminal device receives the downlink channel based on the target SS determined at S201. As an example, the terminal device receives the downlink channel in the target SS and a corresponding control resource set (i.e., CORESET).

In some embodiments, the downlink channel may be a downlink channel scrambled by a Cell-Radio Network Temporary Identifier (C-RNTI).

In some embodiments, the downlink channel may be a PDCCH, and the PDCCH may be used to schedule at least one of uplink transmission or downlink transmission.

In some embodiments, the method may further include the following operation S204.

At S204, the terminal device terminates at least one of reception of the downlink channel or the RA-SDT, in response to the terminal device receiving a first RRC message.

In some embodiments, the terminal device terminating reception of the downlink channel may refer to that the terminal device terminates reception of the downlink channel based on the target SS and the corresponding control resource set.

In some embodiments, the first RRC message may include at least one of: a RRC Resume message, a RRC Release message, or a RRC Setup message.

As shown in FIG. 4, an optional processing flow of a channel transmission method according to an embodiment of the disclosure is provided and may include at least the following operation S301.

At S301, a network device transmits first configuration information to a terminal device, where the first configuration information is used by the terminal device to determine a target SS where a downlink channel is received, the downlink channel being transmitted after a contention conflict is successfully resolved in a RA-SDT.

In some embodiments, the first configuration information may be carried in at least one of a system broadcast message or dedicated signaling.

The first configuration information includes at least one of configuration information of a first CSS or an SS configuration list. The SS configuration list includes configuration information of at least one CSS. As an example, the first configuration information may include the configuration information of the first CSS. As another example, the first configuration information may include the SS configuration list, and the SS configuration list includes the configuration information of at least one CSS. As yet another example, the first configuration information may further include the configuration information of the first CSS and the SS configuration list, and the SS configuration list includes the configuration information of at least one CSS.

In some embodiments, when the first configuration information includes the configuration information of the first CSS, or when the first configuration information includes the configuration information of the first CSS and the SS configuration list, the terminal device determines that the target SS where the downlink channel is received is the first CSS.

In some embodiments, the configuration information of the first CSS is configuration information used for scheduling at least one of the SDT or a subsequent transmission of the SDT. As an example, the target SS determined based on the configuration information of the first CSS is used for scheduling at least one of the SDT or the subsequent transmission of the SDT.

In some other embodiments, when the first configuration information includes the SS configuration list, and the SS configuration list includes the configuration information of at least one CSS, the channel transmission method further includes the following operation S302.

At S302, the network device transmits first indication information to the terminal device, where the first indication information is used for determining a first index value.

In some embodiments, the target SS is an SS, corresponding to the first index value, in the SS configuration list.

In some embodiments, the first indication information may be carried in at least one of: a MAC CE, a DCI, or RRC signaling. As an example, the MAC CE may be carried in Msg4 or MsgB. As an example, the first indication information may be carried in a RRC Release message.

In some embodiments, the first indication information may include the first index value.

In some other embodiments, the first indication information may include an I-RNTI. The first index value is obtained by the I-RNTI performing a modulus operation on a first numerical value, and the first numerical value is the number of configuration information of CSSs in the SS configuration list. For example, the SS configuration list includes configuration information of five CSSs, IDs of the five CSSs are 1-5 or 0-4, the first indication information includes the I-RNTI, then the terminal device determines the target SS according to a value obtained by I-RNTI mod 5; and when the value obtained by the I-RNTI mod 5 is 1, the target SS is a CSS with an ID of 1 in the SS configuration list.

In some embodiments, configuration information of each CSS in the SS configuration list corresponds to a respective index value or a respective ID, the terminal device searches the SS configuration list for configuration information of a CSS corresponding to the first index value, and determines that the CSS indicated by the configuration information of the CSS corresponding to the first index value is the target SS.

As shown in FIG. 5, a detailed optional processing flow of a RA-SDT method according to an embodiment of the disclosure is provided. The method may be applied to a terminal device in a RRC_INACTIVE state to initiate a RA-SDT process, and may include at least the following operations S401 to S405.

At S401, a terminal device selects a preamble and a RACH Occasion (RO) for transmission of the preamble, in random access resources for a RA-SDT.

In some embodiments, in case of a RA-SDT process based on a two-step random access, the terminal device may further determine a PO resource for transmission of a MsgA payload.

At S402, the terminal device initiates the RA-SDT on the random access resources for the RA-SDT. In some embodiments, in case of a SDT process based on a four-step random access, the terminal device transmits Msg3 through a UP Link (UL) grant scheduled in a Random Access Response (RAR), monitors Msg4 transmitted by a network device, and determines, based on Msg4, whether a contention conflict is resolved.

In case of a SDT based on a two-step random access, after transmitting MsgA, the terminal device monitors MsgB transmitted by the network device, and determines, based on MsgB, whether a contention conflict is resolved.

In some embodiments, the terminal device receives a downlink PDCCH based on a CSS type1 SS, in a random access process.

At S403, the terminal device determines a target SS based on configuration information of a first CSS in first configuration information.

In some embodiments, the terminal device receives the first configuration information transmitted by the network device, the first configuration information includes configuration information of a first CSS, then the terminal device determines that the target SS is the first CSS.

At S404, the terminal device determines, based on Msg4 or MsgB, that the contention conflict is successfully resolved, and the terminal device receives a downlink channel based on the target SS and a corresponding control resource set.

In some embodiments, the downlink channel may be a PDCCH scrambled by a C-RNTI, and the PDCCH is used for scheduling at least one of uplink transmission or downlink transmission.

At S405, the terminal device receives a first RRC message, and terminates the RA-SDT and reception of the downlink channel.

In some embodiments, the first RRC message may include at least one of: a RRC Resume message, a RRC Release message, or a RRC Setup message. As an example, after determining that the contention conflict is successfully resolved, the terminal device receives the downlink channel based on the target SS and the corresponding control resource set; and then the terminal device receives the RRC Release message, thus the terminal device terminates reception of the downlink channel and the RA-SDT.

As shown in FIG. 6, another detailed optional processing flow of a RA-SDT method according to an embodiment of the disclosure is provided, the method may be applied to a terminal device in a RRC_INACTIVE state to initiate a RA-SDT process, and may include at least the following operations S501 to S505.

At S501, a terminal device selects a preamble and a RO for transmission of the preamble, in random access resources for a RA-SDT.

In some embodiments, in case of a RA-SDT process based on a two-step random access, the terminal device may further determine a PO resource for transmission of a MsgA payload.

At S502, the terminal device initiates the RA-SDT on the random access resources for the RA-SDT. In some embodiments, in case of a SDT based on a four-step random access, the terminal device transmits Msg3 through a UL grant scheduled in a RAR, monitors Msg4 transmitted by a network device, and determines, based on Msg4, whether a contention conflict is resolved.

In case of a SDT based on a two-step random access, after transmitting MsgA, the terminal device monitors MsgB transmitted by the network device, and determines, based on MsgB, whether a contention conflict is resolved.

In some embodiments, the terminal device receives a downlink PDCCH based on a CSS type1 SS, in a random access process.

At S503, the terminal device determines a target SS based on first configuration information and first indication information.

In some embodiments, the terminal device receives the first configuration information and the first indication information transmitted by the network device, the first configuration information includes a SS configuration list, and the SS configuration list includes configuration information of at least one CSS; and configuration information of each CSS in the SS configuration list corresponds to an index value.

In some embodiments, the terminal device searches the SS configuration list for configuration information of CSS corresponding to an index value indicated by the first indication information; and determines the CSS corresponding to the index value as the target SS. For example, the SS configuration list includes configuration information of six CSSs, and corresponding index values thereof are 0-5; and when the index value indicated by the first indication information is 2, the target SS is a CSS, corresponding to the index value of 2, in the SS configuration list.

In some other embodiments, the first indication information is carried in a RRC Release message transmitted by a last serving cell of the terminal device, and the RRC Release message includes an I-RNTI; the SS configuration list includes configuration information of six CSSs, and corresponding index values thereof are 0-5; the terminal device calculates a result obtained by an I-RNTI mod 6, and when the result is 3, it is determined that the target SS is a CSS with an ID of 3 in the SS configuration list.

In some embodiments, the first indication information may be carried in a MAC CE in Msg4 or MsgB.

At S504, the terminal device determines, based on Msg4 or MsgB, that the contention conflict is successfully resolved, and the terminal device receives a downlink channel based on the target SS and a corresponding control resource set.

In some embodiments, the downlink channel may be a PDCCH scrambled by a C-RNTI, and the PDCCH is used for scheduling at least one of uplink transmission or downlink transmission.

At S505, the terminal device receives a first RRC message, and terminates the RA-SDT and reception of the downlink channel.

In some embodiments, the first RRC message may include at least one of: a RRC Resume message, a RRC Release message, or a RRC Setup message. As an example, after determining that the contention conflict is successfully resolved, the terminal device receives the downlink channel based on the target SS and the corresponding control resource set; and then the terminal device receives the RRC Release message, thus the terminal device terminates reception of the downlink channel and the RA-SDT.

It should be understood that in various embodiments of the disclosure, values of serial numbers of the above processes do not indicate orders of execution sequences, execution sequence of each process should be determined by its function and internal logic, and should not constitute any limitation on implementations of the embodiments of the disclosure.

According to the channel transmission methods provided in the embodiments of the disclosure, it is specified that after the terminal device performs RA-SDT based on SS configured by the network device, when the contention conflict is successfully resolved, the terminal device may determine the target SS for subsequent transmission based on the first configuration information transmitted by the network device, or based on the first configuration information and the first indication information transmitted by the network device, a problem of resource congestion caused by the terminal device continuing to use the SS for RA-SDT configured by the network device to receive the subsequent transmission is avoided, thereby improving a success rate of a legacy terminal device executing the random access process.

In order to implement the above channel transmission methods, an embodiment of the disclosure further provides a terminal device. A composition structure of the terminal device is shown in FIG. 7, and the terminal device 600 includes a receiving unit 601.

The receiving unit 601 is configured to receive first configuration information, where the first configuration information is used for determining a target SS where the terminal device receives a downlink channel, and the downlink channel is transmitted after a contention conflict is successfully resolved in a RA-SDT.

In some embodiments, the first configuration information includes at least one of: configuration information of a first CSS, or an SS configuration list.

The SS configuration list includes configuration information of at least one CSS.

In some embodiments, the target SS is the first CSS.

In some embodiments, the configuration information of the first CSS is configuration information used for scheduling at least one of the SDT or a subsequent transmission of the SDT.

In some embodiments, the receiving unit 601 is further configured to receive first indication information, where the first indication information is used for determining a first index value.

The target SS is an SS, corresponding to the first index value, in the SS configuration list.

In some embodiments, the first indication information includes the first index value; or, the first indication information includes an I-RNTI, the first index value is obtained by the I-RNTI performing a modulus operation on a first numerical value, and the first numerical value is the number of configuration information of CSSs in the SS configuration list.

In some embodiments, the first indication information is carried in at least one of: a MAC CE, a DCI, or RRC signaling.

In some embodiments, the receiving unit 601 is further configured to receive the downlink channel based on the target SS, in response to successfully resolving the contention conflict during the RA-SDT.

In some embodiments, the downlink channel is scrambled by a C-RNTI.

In some embodiments, the receiving unit terminates at least one of reception of the downlink channel or the RA-SDT, in response to the receiving unit 601 receiving a first RRC message.

In some embodiments, the first RRC message includes at least one of: a RRC Resume message, a RRC Release message, or a RRC Setup message.

In some embodiments, the first configuration information is carried in at least one of a system broadcast message or dedicated signaling.

Figure 8:
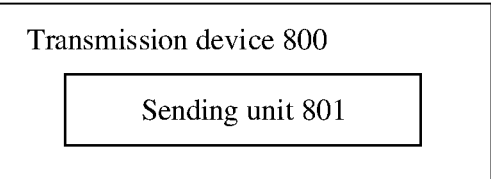
FIG. 8 is a schematic structural diagram of composition of a network device according to an embodiment of the disclosure.

In order to implement the above channel transmission methods, an embodiment of the disclosure further provides a network device, a composition structure of the network device is shown in FIG. 8, and the network device 800 includes a sending unit 801.

The sending unit 801 is configured to send first configuration information to a terminal device, where the first configuration information is used by the terminal device to determine a target SS where a downlink channel is received, and the downlink channel is transmitted after a contention conflict is successfully resolved in a RA-SDT.

In some embodiments, the first configuration information includes at least one of: configuration information of a first CSS; or an SS configuration list.

The SS configuration list includes configuration information of at least one CSS.

In some embodiments, the target SS is the first CSS.

In some embodiments, the configuration information of the first CSS is configuration information used for scheduling at least one of the SDT or a subsequent transmission of the SDT.

In some embodiments, the sending unit 801 is further configured to send first indication information to the terminal device, where the first indication information is used for determining a first index value.

The target SS is an SS, corresponding to the first index value, in the SS configuration list.

In some embodiments, the first indication information includes the first index value; or, the first indication information includes an I-RNTI, the first index value is obtained by the I-RNTI performing a modulus operation on a first numerical value, and the first numerical value is the number of configuration information of CSSs in the SS configuration list.

In some embodiments, the first indication information is carried in at least one of: a MAC CE, a DCI, or RRC signaling.

In some embodiments, the downlink channel is scrambled by a C-RNTI.

In some embodiments, the first configuration information is carried in at least one of a system broadcast message or dedicated signaling.

It should be noted that functions of the sending unit 801 in the embodiment of the disclosure may be implemented by a transmitter or a transceiver, and functions of the receiving unit 601 may be implemented by a receiver or a transceiver.

An embodiment of the disclosure further provides a terminal device, including a processor and a memory configured to store a computer program executable by the processor, here, the processor is configured to run the computer program to perform operations of the above channel transmission method executed by the terminal device.

An embodiment of the disclosure further provides a network device, including a processor and a memory configured to store a computer program executable by the processor, here, the processor is configured to run the computer program to perform operations of the above channel transmission method executed by the network device.

An embodiment of the disclosure further provides a chip, including a processor configured to call and run a computer program from a memory, to cause a device installed with the chip to perform the above channel transmission method executed by the terminal device.

An embodiment of the disclosure further provides a chip, including a processor configured to call and run a computer program from a memory, to cause a device installed with the chip to perform the above channel transmission method executed by the network device.

An embodiment of the disclosure further provides a storage medium, having stored therein an executable program which implements the above channel transmission method executed by the terminal device when the executable program is executed by a processor.

An embodiment of the disclosure further provides a storage medium, having stored therein an executable program which implements the above channel transmission method executed by the network device when the executable program is executed by a processor.

An embodiment of the disclosure further provides a computer program product, including computer program instructions which cause a computer to perform the above channel transmission method executed by the terminal device.

An embodiment of the disclosure further provides a computer program product, including computer program instructions which cause a computer to perform the above channel transmission method executed by the network device.

An embodiment of the disclosure further provides a computer program, which causes a computer to perform the above channel transmission method executed by the terminal device.

An embodiment of the disclosure further provides a computer program, which causes a computer to perform the above channel transmission method executed by the network device.

Figure 9:
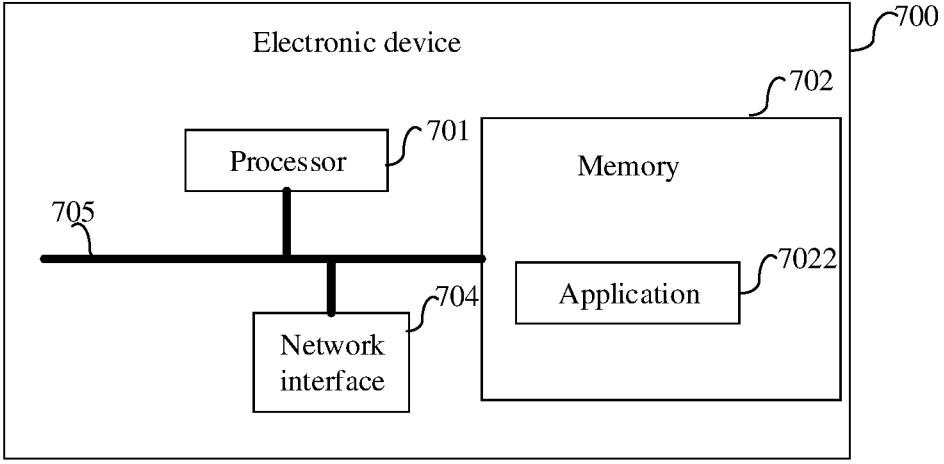
FIG. 9 is a schematic structural diagram of hardware composition of an electronic device according to an embodiment of the disclosure.

FIG. 9 is a schematic structural diagram of hardware composition of an electronic device (a terminal device and a network device) according to an embodiment of the disclosure. The electronic device 700 includes at least one processor 701, a memory 702 and at least one network interface 704. Various components in the electronic device 700 are coupled together by a bus system 705. It may be understood that the bus system 705 is configured to implement connection and communication between these components. In addition to including a data bus, the bus system 705 further includes a power bus, a control bus and a state signal bus. However, for clarity of illustration, various buses are marked as the bus system 705 in FIG. 8.

It may be understood that the memory 702 may be a volatile memory or a non-volatile memory, or may include both the volatile and non-volatile memories. The non-volatile memory may be a Read-Only Memory (ROM), a Programmable ROM (PROM), an Erasable PROM (EPROM), an Electrically EPROM (EEPROM), a Ferromagnetic Random Access Memory (FRAM), a flash memory, a magnetic surface memory, an optical disc, or a Compact Disc Read-Only Memory (CD-ROM); and the magnetic surface memory may be a magnetic disk memory or a magnetic tape memory. The volatile memory may be a Random Access Memory (RAM) used as an external cache. By way of exemplary descriptions rather than restrictive descriptions, many forms of RAMs are available, such as a Static RAM (SRAM), a Synchronous SRAM (SSRAM), a Dynamic RAM (DRAM), a Synchronous DRAM (SDRAM), a Double Data Rate SDRAM (DDR SDRAM), an Enhanced SDRAM (ESDRAM), a SyncLink DRAM (SLDRAM), a Direct Rambus RAM (DRRAM). The memory 702 described in the embodiment of the disclosure is intended to include, but is not limited to, memories of these and any other proper types.

The memory 702 in the embodiment of the disclosure is configured to store various types of data to support operations of the electronic device 700. Examples of these data include any computer program intended to be operated on the electronic device 700, such as an application 7022. Programs implementing the methods according to the embodiments of the disclosure may be included in the application 7022.

The methods disclosed in the embodiments of the disclosure may be applied to the processor 701, or may be implemented by the processor 701. The processor 701 may be an integrated circuit (IC) chip with signal processing capability. During implementation, operations of the above methods may be completed by an integrated logic circuit in form of hardware in the processor 701 or instructions in form of software. The processor 701 may be a general-purpose processor, a Digital Signal Processor (DSP), or other programmable logical devices, a discrete gate or a transistor logical device, a discrete hardware component, or the like. The processor 701 may implement or execute the methods, operations, and logical block diagrams disclosed in the embodiments of the disclosure. The general-purpose processor may be a microprocessor, or any conventional processor, or the like. Operations of the methods disclosed in combination with the embodiments of the disclosure may be directly embodied as being executed and completed by a hardware decoding processor, or executed and completed by combination of hardware in the decoding processor and a software module. The software module may be located in a storage medium, the storage medium is located in the memory 702, and the processor 701 reads information in the memory 702 and completes operations of the above methods in combination with hardware of the processor 701.

In an exemplary embodiment, the electronic device 700 may be implemented by one or more Application Specific Integrated Circuits (ASICs), DSPs, Programmable Logic Devices (PLDs), Complex Programmable Logic Devices (CPLDs), Field Programmable Gate Arrays (FPGAs), general-purpose processors, controllers, Micro-Controller Units (MCUs), Micro-Processor Units (MPUs), or other electronic components, to perform the above methods.

An embodiment of the disclosure further provides a storage medium, configured to store a computer program.

Optionally, the storage medium may be applied to the terminal device in the embodiments of the disclosure, and the computer program causes a computer to perform corresponding processes of the methods in the embodiments of the disclosure, which is not elaborated here for brevity.

Optionally, the storage medium may be applied to the network device in the embodiments of the disclosure, and the computer program causes a computer to perform corresponding processes of the methods in the embodiments of the disclosure, which is not elaborated here for brevity.

The disclosure is described with reference to flowcharts and/or block diagrams of the method, the device (system) and the computer program product according to the embodiments of the disclosure. It should be understood that each flow and/or block in the flowchart and/or block diagram, and combinations of flows and/or blocks in the flowchart and/or block diagram, may be implemented by computer program instructions. These computer program instructions may be provided to a processor of a general-purpose computer, a special-purpose computer, an embedded processor, or other programmable data processing devices, to generate a machine such that instructions executed by the processor of the computer or other programmable data processing devices generate a device configured to implement functions specified in one or more flows of the flowchart and/or one or more blocks of the block diagram.

These computer program instructions may also be stored in a computer-readable memory which may direct a computer or other programmable data processing devices to operate in a particular manner, such that instructions stored in the computer-readable memory generate a product including an instruction device which implements the functions specified in one or more flows of the flowchart and/or one or more blocks of the block diagram.

These computer program instructions may also be loaded onto a computer or other programmable data processing devices, such that a series of operational steps are performed on the computer or other programmable devices, to generate a computer-implemented process, therefore, instructions executed on the computer or other programmable devices provide operations implementing the functions specified in one or more flows of the flowchart and/or one or more blocks of the block diagram.

The foregoing are only preferred embodiments of the disclosure, and are not intended to limit the scope of protection of the disclosure, and any modification, equivalent replacement, improvement, or the like made within the spirit and principle of the disclosure should be included in the scope of protection of the disclosure.

What is claimed is:

1. A method for channel transmission, comprising:

receiving, by a terminal device, first configuration information, wherein the first configuration information is used for determining a target Search Space (SS) where the terminal device receives a downlink channel, the downlink channel being transmitted after a contention conflict is successfully resolved in a Random Access-Small Data Transmission (RA-SDT), and the target SS being used for scheduling a subsequent transmission of the RA-SDT, and wherein the first configuration information comprises an SS configuration list, the SS configuration list comprising configuration information of at least one Common Search Space (CSS); and wherein the method further comprises:

receiving, by the terminal device, first indication information, the first indication information being carried in a Radio Resource Control (RRC) Release message transmitted by a last serving cell of the terminal device, wherein the first indication information is used for determining a first index value, and wherein the first indication information comprises an Identity-Radio Network Temporary Identifier (I-RNTI), and wherein the first index value is obtained by the I-RNTI performing a modulus operation on a first numerical value, and the first numerical value is a number of configuration information of CSSs in the SS configuration list in the first configuration information;

wherein the method further comprises:

searching, by the terminal device, the SS configuration list in the first configuration information for configuration information of a CSS corresponding to the first index value, and determining that the CSS indicated by the configuration information of the CSS corresponding to the first index value is the target SS.

2. The method of claim 1, further comprising:

receiving, by the terminal device, the downlink channel based on the target SS, in response to successfully resolving the contention conflict in the RA-SDT.

3. The method of claim 2, further comprising:

terminating, by the terminal device, at least one of reception of the downlink channel or the RA-SDT, in response to receiving a first RRC message.

4. The method of claim 3, wherein the first RRC message comprises at least one of:

a RRC Resume message;

a RRC Release message; or a RRC Setup message.

5. The method of claim 1, wherein at least one of the following applies:

the downlink channel is scrambled by a Cell-Radio Network Temporary Identifier (C-RNTI); or the first configuration information is carried in at least one of a system broadcast message or dedicated signaling.

6. A network device, comprising:

a processor; and a memory configured to store a computer program executable by the processor, wherein the processor is configured to run the computer program, to cause the network device to:

send first configuration information to a terminal device, wherein the first configuration information is used by the terminal device to determine a target Search Space (SS) where a downlink channel is received, the downlink channel being transmitted after a contention conflict is successfully resolved in a Random Access-Small Data Transmission (RA-SDT), and the target SS being used for scheduling a subsequent transmission of the RA-SDT, and wherein the first configuration information comprises an SS configuration list, the SS configuration list comprising configuration information of at least one Common Search Space (CSS); and wherein the processor is further configured to run the computer program, to cause the network device to send first indication information to the terminal device, the first indication information being carried in a Radio Resource Control (RRC) Release message transmitted by a last serving cell of the terminal device, wherein the first indication information is used for determining a first index value, and wherein the first indication information comprises an Identity-Radio Network Temporary Identifier (I-RNTI), and wherein the first index value is obtained by the I-RNTI performing a modulus operation on a first numerical value, and the first numerical value is a number of configuration information of CSSs in the SS configuration list in the first configuration information, and wherein the SS configuration list in the first configuration information is searched for configuration information of a CSS corresponding to the first index value, and the CSS indicated by the configuration information of the CSS corresponding to the first index value is determined to be the target SS.

7. The network device of claim 6, wherein at least one of the following applies:

the downlink channel is scrambled by a Cell-Radio Network Temporary Identifier (C-RNTI); or the first configuration information is carried in at least one of a system broadcast message or dedicated signaling.

8. A terminal device, comprising:

a processor; and a memory configured to store a computer program executable by the processor, wherein the processor is configured to run the computer program, to cause the terminal device to receive first configuration information, wherein the first configuration information is used for determining a target Search Space (SS) where the terminal device receives a downlink channel, the downlink channel being transmitted after a contention conflict is successfully resolved in a Random Access-Small Data Transmission (RA-SDT), and the target SS being used for scheduling a subsequent transmission of the RA-SDT, and wherein the first configuration information comprises an SS configuration list, the SS configuration list comprising configuration information of at least one Common Search Space (CSS); and wherein the processor is further configured to run the computer program, to cause the terminal device to receive first indication information, the first indication information being carried in a Radio Resource Control (RRC) Release message transmitted by a last serving cell of the terminal device, wherein the first indication information is used for determining a first index value, and wherein the first indication information comprises an Identity-Radio Network Temporary Identifier (I-RNTI), and wherein the first index value is obtained by the I-RNTI performing a modulus operation on a first numerical value, and the first numerical value is a number of configuration information of CSSs in the SS configuration list in the first configuration information;

wherein the processor is further configured to run the computer program, to cause the terminal device to:

search the SS configuration list in the first configuration information for configuration information of a CSS corresponding to the first index value, and determine that the CSS indicated by the configuration information of the CSS corresponding to the first index value is the target SS.

9. The terminal device of claim 8, wherein the processor is further configured to run the computer program, to cause the terminal device to perform operations comprising:

receiving the downlink channel based on the target SS, in response to successfully resolving the contention conflict in the RA-SDT.

10. The terminal device of claim 9, wherein the processor is further configured to run the computer program, to cause the terminal device to perform operations comprising:

terminating at least one of reception of the downlink channel or the RA-SDT, in response to receiving a first RRC message.

11. The terminal device of claim 10, wherein the first RRC message comprises at least one of:

a RRC Resume message;

a RRC Release message; or a RRC Setup message.

12. The terminal device of claim 8, wherein at least one of the following applies:

the downlink channel is scrambled by a Cell-Radio Network Temporary Identifier (C-RNTI); or the first configuration information is carried in at least one of a system broadcast message or dedicated signaling.

* * * * *